(12) United States Patent
Soni et al.

(10) Patent No.: US 9,506,775 B2
(45) Date of Patent: Nov. 29, 2016

(54) SMART FUEL INDICATOR

(71) Applicant: QUALCOMM Incorporated, San Diego, CA (US)

(72) Inventors: Radhika Ranjan Soni, Maharashtra (IN); Vinay Krishna Roy, Telengana (IN); Sreeja Nair, Maharashtra (IN)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 14/627,916

(22) Filed: Feb. 20, 2015

(65) Prior Publication Data

US 2016/0245664 A1 Aug. 25, 2016

(51) Int. Cl.
  *G01C 21/36* (2006.01)

(52) U.S. Cl.
  CPC ................. *G01C 21/3697* (2013.01)

(58) Field of Classification Search
  CPC .......... G01C 21/3469; G01C 21/3697; B60R 16/0236; B60R 25/042; B60R 25/101
  See application file for complete search history.

(56) References Cited

U.S. PATENT DOCUMENTS

| 8,153,314 | B2* | 4/2012 | Umayahara et al. | 429/429 |
| 2007/0090937 | A1* | 4/2007 | Stabler | 340/450.2 |
| 2009/0265099 | A1* | 10/2009 | Gottlieb | 701/208 |
| 2010/0073158 | A1* | 3/2010 | Uesaka et al. | 340/450.2 |
| 2010/0106514 | A1* | 4/2010 | Cox | 705/1.1 |
| 2010/0148952 | A1* | 6/2010 | Barajas | 340/450.2 |
| 2010/0198508 | A1* | 8/2010 | Tang | 701/210 |
| 2012/0179365 | A1* | 7/2012 | Miyahara | G01C 21/3617 701/428 |
| 2012/0191289 | A1* | 7/2012 | Guo et al. | 701/29.1 |
| 2013/0027426 | A1* | 1/2013 | Sasaki et al. | 345/629 |
| 2013/0226443 | A1* | 8/2013 | Scofield et al. | 701/123 |
| 2014/0052368 | A1* | 2/2014 | Varughese et al. | 701/123 |
| 2014/0067225 | A1* | 3/2014 | Lee et al. | 701/93 |
| 2015/0106001 | A1* | 4/2015 | Lee et al. | 701/123 |
| 2015/0168172 | A1* | 6/2015 | Roth et al. | 701/123 |

FOREIGN PATENT DOCUMENTS

CN 103791961 A1 * 5/2014

* cited by examiner

*Primary Examiner* — Thomas G Black
*Assistant Examiner* — Ce Li
(74) *Attorney, Agent, or Firm* — Haynes and Boone, LLP

(57) ABSTRACT

An example method of providing a fuel alert to a user includes calculating a range for a transportation device based on a determined level of fuel and an average fuel efficiency. The method also includes for one or more candidate fuel stations, determining a distance of a route to each fuel station, and alerting a user when the range is less than any of the one or more distances.

20 Claims, 8 Drawing Sheets

300

| | 302 | 304 | 306 | |
|---|---|---|---|---|
| Traffic Conditions | Road Conditions | Average Fuel Efficiency (MPG) | | — 308 |
| Green | A | 30 | | — 310 |
| Green | B | 25 | | — 312 |
| Yellow | A | 25 | | — 314 |
| Red | C | 23 | | |

FIG. 3

SMART FUEL INDICATOR

FIELD OF DISCLOSURE

The present disclosure generally relates to fuel alerts, and more particularly to providing a fuel alert to a user relative to the user's proximity to a point of interest (POI).

BACKGROUND

Cars are ubiquitous and are used in everyday life. As more people own cars, fuel stations have become more important, and people have come to depend on fuel stations to pump gas. Currently, a digital fuel indicator on a car dashboard shows a fuel alert when the fuel in the vehicle reaches a predefined minimum level. For example, a driver may be alerted when the level of fuel in the car falls below three gallons. Unfortunately, the fuel alert may not always help because the predefined minimum level of the fuel might not be sufficient to reach the nearest fuel station. In this situation, the driver may be unable to reach a fuel station before running out of gas.

Additionally, if the user becomes aware of the low level of fuel, the user may enter a fuel station as a point of interest (POI) in a global position system (GPS) in order to be re-routed to a fuel station. A conventional GPS may route the user to the nearest fuel station without regard to costs associated with the route.

BRIEF SUMMARY

It may be desirable to provide a fuel alert to the user well in advance before the user is unable to reach a fuel station. Methods, systems, and techniques for providing a fuel alert to a user are provided.

According to some embodiments, an example method of providing a fuel alert to a user includes calculating a range for a transportation device based on a determined level of fuel and an average fuel efficiency. The example method also includes for one or more candidate fuel stations, determining a distance of a route to each fuel station. The method further includes alerting a user when the range is less than any of the one or more distances.

According to some embodiments, a system for providing a fuel alert to a user includes an adaptive fuel indicator that calculates a range for a transportation device based on a predetermined level of fuel and an average fuel efficiency. The adaptive fuel indicator determines a distance of a route to one or more candidate fuel stations, and alerts a user when the range is less than any of the one or more distances.

According to some embodiments, a computer-readable medium has stored thereon computer-executable instructions for performing operations including: calculating a range for a transportation device based on a determined level of fuel and an average fuel efficiency; for one or more candidate fuel stations, determining a distance of a route to each fuel station; and alerting a user when the range is less than any of the one or more distances.

BRIEF DESCRIPTION OF THE DRAWINGS

The accompanying drawings, which form a part of the specification, illustrate embodiments and together with the description, further serve to explain the principles of the embodiments. In the drawings, like reference numbers may indicate identical or functionally similar elements. The drawing in which an element first appears is generally indicated by the left-most digit in the corresponding reference number.

FIG. 3 provides an illustration of a histogram, according to some embodiments.

DETAILED DESCRIPTION

I. Overview
II. Example System Architecture
  A. Fuel Level
  B. Average Fuel Efficiency
    1. No Instantaneous Fuel Efficiency Information Collected
    2. Instantaneous Fuel Efficiency Information Collected
III. Point of Interest (POI) in Relation to Transportation Device's Location
  A. Maximum Distance-to-travel
  B. Set of POIs in Relation to Transportation Device's Location
  C. Provide the Fuel Alert to the User
    1. Routes to One or More POIs
    2. Route Information Associated with One or More POIs
    3. Select a Route from a Plurality of Routes
    4. Apply Weights to Each Route
IV. Example Method
V. Example Computing Device

I. Overview

It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides techniques to provide a fuel alert to a user based on the user's proximity to one or more points of interest (POIs). In an example, the POI is a fuel station. A range for a transportation device may be calculated based on a determined level of fuel and an average fuel efficiency. For one or more candidate fuel stations, a distance of a route to each fuel station may be determined. An alert may be provided to the user when the range is less than any of the one or more distances.

II. Example System Architecture

Figure 1:
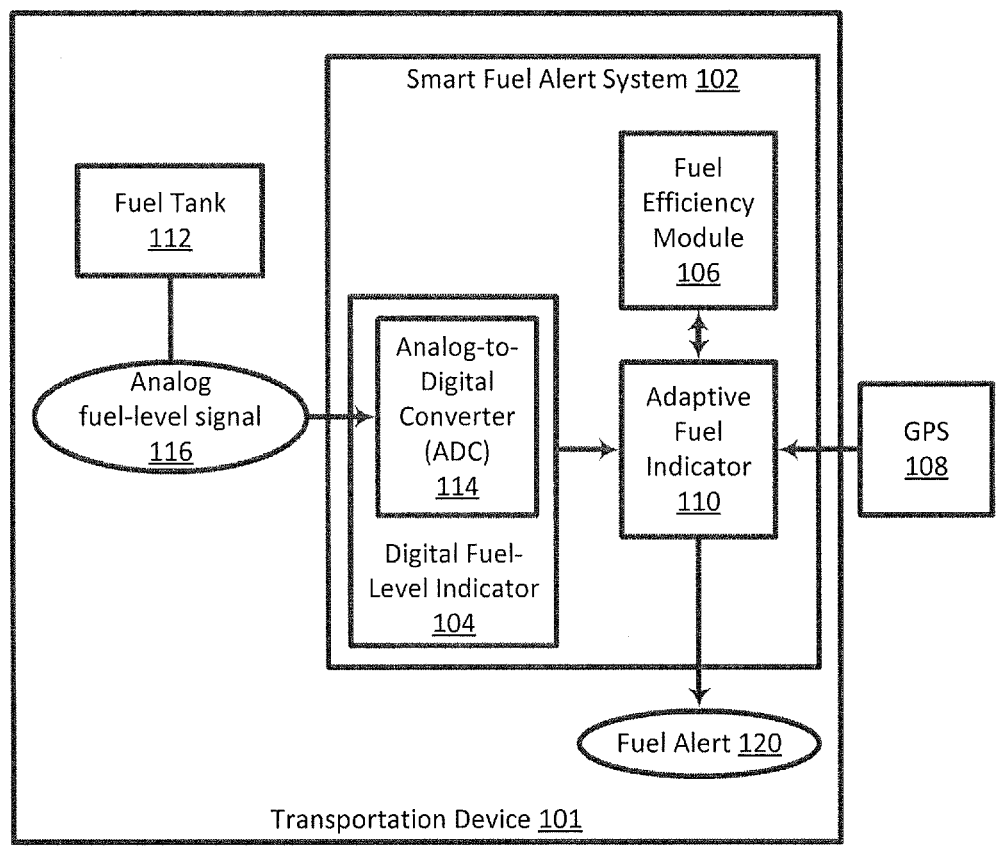
FIG. 1 is a block diagram illustrating a system for providing a fuel alert to a user, according to some embodiments.

FIG. 1 is a block diagram 100 illustrating a system 100 for providing a fuel alert to a user, according to some embodiments. System 100 includes a transportation device 101 including a smart fuel alert system 102. Transportation device 101 uses fuel to operate and physically move from one location to another location. Transportation device 101 may be, for example, a car, moped, motorcycle, boat, or scooter.

In the example illustrated in FIG. 1, smart fuel alert system 102 includes a digital fuel-level indicator 104, a fuel efficiency module 106, and an adaptive fuel indicator 110, which may be used to provide a fuel alert to a user in relation to his/her location relative to a point-of-interest (POI). Digital fuel-level indicator 104 may provide adaptive fuel indicator 110 with transportation device 101's level of fuel, and fuel efficiency module 106 may provide adaptive fuel indicator 110 with transportation device 101's average fuel efficiency.

Adaptive fuel indicator 110 may run on a processor. Adaptive fuel indicator 110 may obtain transportation device 101's level of fuel and average fuel efficiency and use this information in conjunction with route information provided by GPS 108 (e.g., directions from transportation device 101 to the POI, a distance of the route, traffic conditions along the route, or road conditions along the route) to determine whether to provide fuel alert 120 to the user. In an example, the POI is a fuel station. In some embodiments, for one or more fuel stations relative to transportation device 101's location, adaptive fuel indicator 110 determines a distance of a route from transportation device 101 to the fuel station, compares the maximum distance that transportation device 101 can travel (given its fuel level and fuel efficiency) with the one or more route distances, and provides, based on the comparison, fuel alert 120 to the user.

In an example, fuel alert 120 may alert the user that transportation device 101 is running low on fuel and that the user should pump gas soon before the user is too far from a fuel station to do so. Smart fuel alert system 102 uses the location of fuel stations relative to transportation device 101's location to provide the fuel alert to the user rather than providing the fuel alert based on the level of fuel falling below a predetermined level. Fuel alert 120 may be, for example, a visible alert (e.g., a light that turns on in the dashboard of transportation device 101), an audible alert (e.g., a message that informs the user to pump gas soon), and/or a tactile alert (e.g., causing the user's seat or steering wheel to vibrate). Providing fuel alert 120 to the user may include re-routing the user to a fuel station via GPS 108, as will be further discussed below. In an example, adaptive fuel indicator 110 may display a message such as "You are running low on fuel. Would you like me to re-route you to a fuel station?" to the user and provide the user with a "Yes" and "No" option. The user may select one of these options. If the user selects "Yes," adaptive fuel indicator 110 may re-route the user to a fuel station.

GPS 108 may provide to smart fuel alert system 102 the location and route information associated with a route to the fuel station. GPS 108 has information about POIs (e.g., fuel stations) and their locations. GPS 108 may be an inbuilt GPS of transportation device 101 or may be a navigational application running on a user's device (e.g., smartphone or laptop). Accordingly, smart fuel alert system 102 is better adapted to provide the user with a real-world fuel alert based on the user's location relative to the fuel station to ensure that the user has sufficient fuel to reach the fuel station compared to conventional techniques. It is important to note that although the POI may be described as being a fuel station in the present disclosure, this is not intended to be limiting. For example, the POI may be an auto repair shop, junkyard, restaurant, shopping center, or the user's house.

A. Fuel Level

Transportation device 101 includes a fuel tank 112 that is a safe container for flammable fluids. Fuel tank 112 stores fuel and may be part of an engine system in which the fuel is stored and propelled or released into an engine in transportation device 101. Digital fuel-level indicator 104 determines a level of fuel in transportation device 101. Digital fuel-level indicator 104 includes an analog-to-digital converter (ADC) 114 that receives an analog fuel-level signal 116 from fuel tank 112 and converts analog fuel-level signal 116 into a digital fuel-level signal. Analog fuel-level signal 116 and the digital fuel-level signal are each an indication of the level of fuel in fuel tank 112. Digital fuel-level indicator 104 sends the digital fuel-level signal to adaptive fuel indicator 110, which receives the digital signal and determines the level of fuel in transportation device 101.

B. Average Fuel Efficiency

Fuel efficiency module 106 may determine transportation device 101's average fuel efficiency (e.g., miles per gallon (MPG) or kilometers per liter) and pass this information along to adaptive fuel indicator 110 for further processing. In an example, fuel efficiency module 106 estimates the distance that transportation device 101 is able to travel per volume of fuel in transportation device 101. Fuel efficiency module 106 may determine transportation device 101's average fuel efficiency in various ways.

Figure 2:
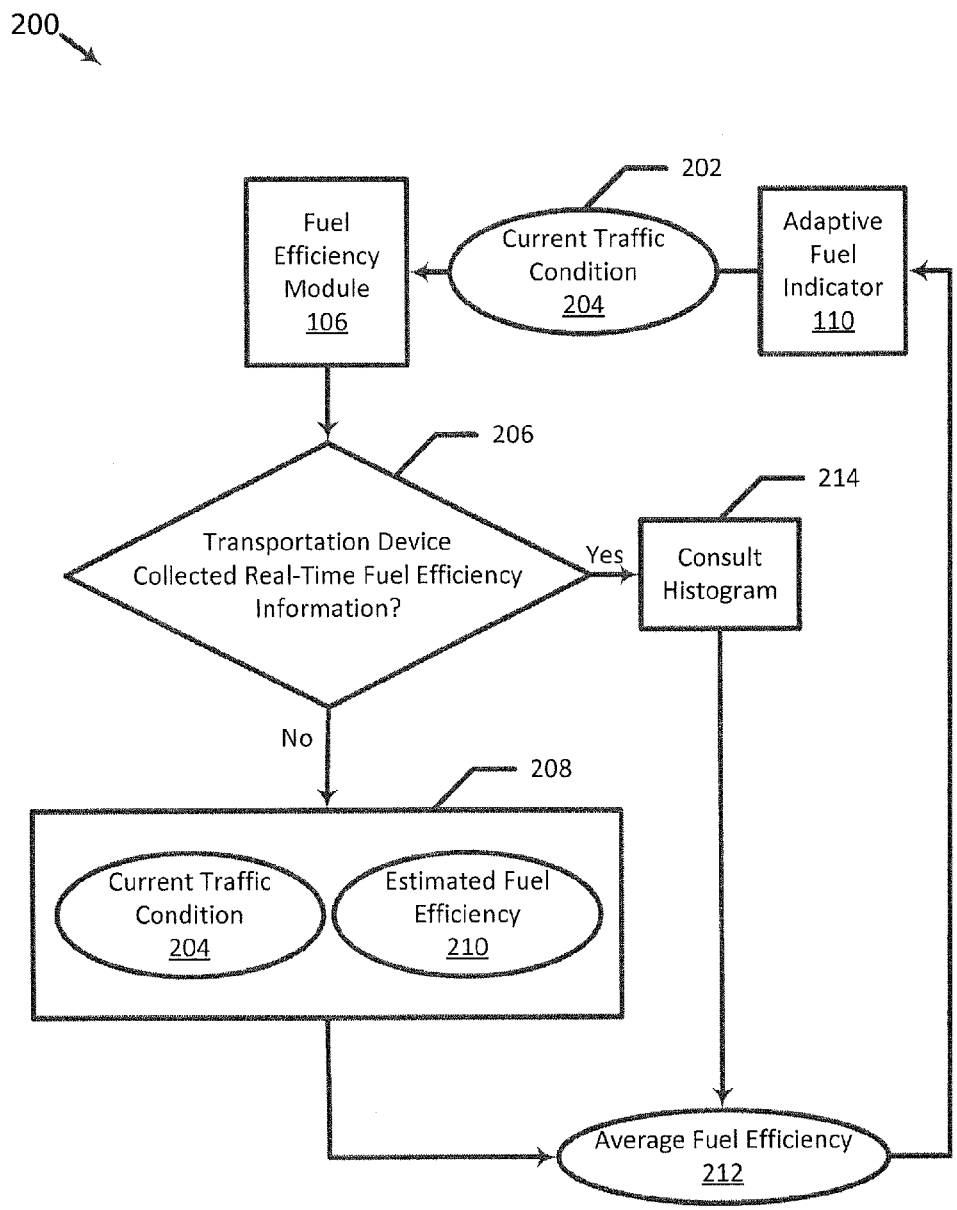
FIG. 2 provides an example process flow of calculating a transportation device's average fuel efficiency, according to some embodiments.

FIG. 2 provides an example process flow 200 of calculating transportation device 101's average fuel efficiency, according to some embodiments. Process flow 200 includes an action 202, in which adaptive fuel indicator 110 sends a current traffic condition 204 of a route to be traveled by transportation device 101 to fuel efficiency module 106. Adaptive fuel indicator 110 may receive current traffic condition 204 from GPS 108. GPS 108 may determine a route from a first location at which transportation device 101 is located to a second location at which a fuel station is located, and provide the directions from the first location to the second location.

Additionally, GPS 108 provides one or more current traffic conditions of the route. Traffic conditions of a route may vary from heavy traffic, medium traffic, light traffic, and no traffic, and may be depicted using different colors to represent different traffic conditions on a display coupled to the GPS. For example, a red color along a route may represent heavy traffic, a yellow color along a route may represent light traffic, a green color along a route may represent no traffic, and a grey color along a route may represent a "Don't Know." One route may have varying traffic conditions. For example, a first portion of a route may have heavy traffic and a second portion of the route may have light traffic.

GPS 108 may determine the traffic conditions of the route and pass this route information along to smart fuel alert system 102 for further processing. The graphical display may be coupled to fuel efficiency module 106, which may be knowledgeable of the color coding scheme and thus able to determine the traffic conditions along the route. At an action 206, fuel efficiency module 106 determines whether transportation device 101 has collected real-time fuel efficiency information on current traffic condition 204. Real-time fuel efficiency information may be collected while transportation device is actually moving and may also be referred to as instantaneous fuel efficiency information.

1. No Instantaneous Fuel Efficiency Information Collected

No information may have been collected about transportation device 101's fuel efficiency yet if transportation device 101 is new and has not been driven by the user yet. If fuel efficiency module 106 determines that no instantaneous fuel efficiency information has been collected, process flow 200 proceeds to an action 208, in which fuel efficiency module 106 calculates transportation device 101's average fuel efficiency based on current traffic condition 204 and transportation device 101's estimated fuel efficiency 210.

Fuel efficiency module 106 may obtain estimated fuel efficiency 210 in a variety of ways. In some embodiments, fuel efficiency module 106 is coupled to a server over a network and sends a request for estimated fuel efficiency to the server. The server may send a response including estimated fuel efficiency 210 to fuel efficiency module 106.

In some embodiments, estimated fuel efficiency 210 is stored in a memory coupled to fuel efficiency module 106, and fuel efficiency module 106 retrieves estimated fuel efficiency 210 from the memory. In an example, transportation device 101's manufacturer may provide a working manual with an estimate of transportation device 101's fuel efficiency. The manual may specify, for example, that the fuel efficiency on city roads is approximately 27 miles per gallon, on highways is approximately 34 miles per gallon, and on a combined route including city roads and highways is approximately 30 miles per gallon. A provider of smart fuel alert system 102 may reference the manual and program transportation device 101's estimated fuel efficiency (based on the manual) into the memory coupled to fuel efficiency module 106. In another example, estimated fuel efficiency 210 is based on other users' experiences with transportation device 101 or similar models.

In some embodiments, fuel efficiency module 106 calculates average fuel efficiency 212 based on estimated fuel efficiency 210 and current traffic condition 204 of a route to be traveled by transportation device 101. In some embodiments, fuel efficiency module 106 applies a weight to estimated fuel efficiency 210 and obtains the average fuel efficiency based on applying the weight, which. The weight may be based on current traffic condition 204.

In an example, fuel efficiency module 106 multiplies estimated fuel efficiency 210 by a number, where the number depends on the current traffic condition 204 of the route. In an example, for heavy traffic conditions, fuel efficiency module 106 calculates the average fuel efficiency by multiplying estimated fuel efficiency 210 (e.g., 30 MPG) by 50%. In another example, for medium traffic conditions, fuel efficiency module 106 calculates the average fuel efficiency by multiplying estimated fuel efficiency 210 by 30%. In another example, for light traffic conditions, fuel efficiency module 106 calculates the average fuel efficiency by multiplying estimated fuel efficiency 210 by 20%. In another example, for no traffic, fuel efficiency module 106 determines that the average fuel efficiency is equal to estimated fuel efficiency 210. These are merely examples, and these percentages may vary. Moreover, fuel efficiency module 106 may use more complicated operations aside from multiplication in order to calculate the average fuel efficiency. Average fuel efficiency 212 is provided to adaptive fuel indicator 110 for further processing.

2. Instantaneous Fuel Efficiency Information Collected

If fuel efficiency module 106 determines that instantaneous fuel efficiency information has been current, process flow 200 proceeds from action 206 to an action 214, in which fuel efficiency module 106 consults a histogram to calculate transportation device 101's average fuel efficiency. Average fuel efficiency 212 is found in the histogram and provided to adaptive fuel indicator 110.

Factors such as road conditions and traffic conditions may come into play when determining the average fuel efficiency. As transportation device 101 moves from one location to another location, fuel efficiency module 106 may collect and maintain data on transportation device 101's real-time fuel efficiency. In an example, as transportation device 101 is moving, fuel efficiency module 106 maintains a histogram including the history of transportation device 101's movement and the route information encountered while moving. Example route information includes traffic conditions, road conditions, or other conditions along a route that may affect transportation device 101's fuel efficiency while traveling along the route. Fuel efficiency module 106 may include information about the current traffic and/or road conditions along with the instantaneous fuel efficiency while encountering those traffic and/or road conditions. The histogram may map particular traffic and road conditions of routes to a particular average fuel efficiency.

The histogram may be maintained and updated in transportation device 101. Based on the histogram and location of transportation device 101, adaptive fuel indicator 110 may find the location(s) of the fuel stations. Fuel efficiency module 106 may continuously update the average fuel efficiency in the histogram if transportation device 101's average fuel efficiency changes. To reduce the number of times fuel efficiency module 106 updates the histogram, fuel efficiency module 106 may determine whether changes to the average fuel efficiency based on traffic condition(s) and/or road condition(s) of a route satisfy a threshold. If the changes to the average fuel efficiency satisfy the threshold, fuel efficiency module 106 updates the histogram. In contrast, if the changes to the average fuel efficiency do not satisfy the threshold, fuel efficiency module 106 does not update the histogram.

FIG. 3 provides an illustration of a histogram 300, according to some embodiments. In the example illustrated in FIG. 3, histogram 300 includes a "Traffic Conditions" column 302, a "Road Conditions" column 304, and an "Average Fuel Efficiency (MPG)" column 306. GPS 108 may determine the traffic conditions of a route and depict the traffic conditions on a graphical display. Fuel efficiency module 106 maintains histogram 300 and stores the traffic and road conditions of a route in the histogram as transportation device 101 is moving. Fuel efficiency module 106 depicts the traffic conditions of a route using different colors to represent different traffic conditions in histogram 300. It should be understood that traffic conditions may be represented different from that illustrated in FIG. 3. For example, numbers may be used to represent different traffic conditions, where the greater the number, the more congested the route.

GPS 108 may determine the road conditions of a route and depict the road conditions on a graphical display coupled to the GPS. In an example, the average speed on various roads may be calculated using the GPS data of mobile devices and by using triangulation in addition to the maximum speed of the route. In this example, a road condition may be depicted by an average speed of other transportation devices moving, and different grades may be used to represent different road conditions along the route. Fuel efficiency module 106 depicts the road conditions of a route using different grades to represent different road conditions in histogram 300. In an example, an average speed of 40 miles per hour (MPH) may be given an "A" grade, an average speed of 30 MPH may be given a "B" grade, an average speed of 20 MPH may be given a "C" grade, an average speed limit of 15 MPH may be given a "D" grade, and anything under an average speed of 15 MPH may be given an "F" grade. In another example, a road condition may be the route's maximum speed limit.

Fuel efficiency module 106 collects information about the instantaneous fuel efficiency and maintains the information in histogram 300. At a later point in time, fuel efficiency module 106 may receive traffic and road conditions of a route and determine transportation device's fuel efficiency on the route by consulting histogram 300. Fuel efficiency module 106 may find similar traffic and/or road conditions in histogram 300 as that encountered on the route and determine the average fuel efficiency based on the similar traffic and road condition.

In the example illustrated in FIG. 3, an entry 308 in histogram 300 indicates that when a route has no traffic with "A" grade road conditions, the average fuel efficiency is 30 MPG. As such, at a later point in time, fuel efficiency module 106 may determine that the average fuel efficiency of any route with no traffic and "A" grade road conditions is 30 MPG.

Additionally, an entry 310 in histogram 300 indicates that when a route has no traffic and "B" grade road conditions, the average fuel efficiency goes down to 25 MPG. Additionally, an entry 312 in histogram 300 indicates that when a route has light traffic and "A" grade road conditions, the average fuel efficiency is 25 MPG. Additionally, an entry 314 in histogram 300 indicates that when a route has heavy traffic and "C" grade road conditions, the average fuel efficiency is 23 MPG. As transportation device 101 moves from one location to another location, fuel efficiency module 106 continues to update histogram 300 in "Average Fuel Efficiency (MGP)" column 306 as per the change.

Histogram 300 is a history of transportation device 101's fuel efficiency given particular traffic and road conditions. As such, histogram 300 may be searched to determine the average fuel efficiency based on particular traffic and/or road conditions that will be encountered along a route. Accordingly, a particular route may be selected as providing transportation device 101 with better fuel efficiency compared to another route. For example, a first route having light traffic and "A" grade road conditions (see entry 312 in FIG. 3) may be selected over a second route having heavy traffic and "C" grade road conditions (see entry 314 in FIG. 3) because transportation device 101 would have better gas mileage traveling the first route (25 MPG) than the second route (23 MPG).

III. Point of Interest (POI) in Relation to Transportation Device's Location

A. Maximum Distance-to-Travel

The average fuel efficiency may be used in conjunction with the level of fuel to determine the maximum distance that transportation device 101 can travel. In an example, adaptive fuel indicator 110 calculates a range for transportation device 101 based on a determined level of fuel and average fuel efficiency.

Adaptive fuel indicator 110 may calculate the range in accordance with Equation (1) below:

$$\text{Distancemax}_{td} = (\text{Level of fuel} \ast \text{Average Fuel efficiency}) \quad \text{Equation (1)},$$

where Distancemax$_{td}$=a transportation device's range.

For example, if fuel tank 112 has two gallons of fuel and fuel efficiency module 106 determines that the average fuel efficiency is 30 MPG, then the range is 60 miles.

B. Set of POIs in Relation to Transportation Device's Location

For one or more candidate fuel stations, GPS 108 may determine a route from transportation device 101 to the respective fuel station. GPS 108 may provide the distance of and directions for the route along with other route information. In some embodiments, adaptive fuel indicator 110 compares the range with the one or more route distances. A route distance may refer to the distance of a route from transportation device 101 to the fuel station. Adaptive fuel indicator 110 may compare the range to one or more route distances to determine whether transportation device 101 can reach one or more of the fuel stations while taking into consideration the level of fuel and average fuel efficiency.

In an example, $N_{fs}$ is a set of N working or preferred fuel stations, where N is a number greater than one. $N_{fs}$ may be defined by a user that enters her preferred fuel stations (e.g., CHEVRON® or COSTCO®) into smart fuel alert system 102. Trademarks are the properties of their respective owners. In this example, the user may change her preferred fuel stations as she sees fit by entering this information into smart fuel alert system 102. In an example, the user may specify the types of fuel stations she prefers and smart fuel alert system 102 may find these fuel stations within a radius of transportation device 101 and include them in $N_{fs}$.

In another example, $N_{fs}$ is defined by smart fuel alert system 102. In this example, adaptive fuel indicator 110 may maintain a database of the user's behavior including the fuel stations frequented by the user. Adaptive fuel indicator 110 may then include these fuel stations in $N_{fs}$ and possibly remove others that the user has not frequented recently. Adaptive fuel indicator 110 may recognize the user's preferred and/or frequented fuel stations within a radius, and thus determine $N_{fs}$ based on transportation device 101's location. In another example, $N_{fs}$ is defined by transportation device 101's manufacturer. It should be understood that $N_{fs}$ may be defined by the user, smart fuel alert system 102, transportation device 101's manufacturer, and/or another manner.

Adaptive fuel indicator 110 may provide fuel alert 120 to the user when an alert condition is satisfied. The alert condition may be based on transportation device 101's location in relation to the location of the fuel stations of the set of N fuel stations ($N_{fs}$). In some embodiments, adaptive fuel indicator 110 defines a safe level in accordance with Equation (2) below:

$$\text{Safe\_Level} = (\text{Distance}_{maxtd})/(\text{Distance}_{maxN}) \quad \text{Equation (2)},$$

where Distance$_{maxtd}$=a transportation device's range, and where Distance$_{maxN}$=maximum distance of a fuel station of a set of fuel stations in relation to the transportation device's location.

In an example, the alert condition is satisfied when the safe level is less than one. If the safe level is less than one, then transportation device 101's range is less than the maximum route distance from transportation device 101 to a fuel station of the set $N_{fs}$. For example, transportation device 101's fuel efficiency may be 30 MPG, transportation device 101 may have one gallon of fuel, and $N_{fs}$ may include three fuel stations that are each within 29 miles of transportation device 101. Accordingly, transportation device 101's range is 30 miles and as long as each of the fuel stations of the set $N_{fs}$ are within 30 miles, fuel alert 120 is not provided to the user. If transportation device 101 moves and is more than 30 miles (e.g., 30.5 miles) from at least one of the three fuel stations, adaptive fuel indicator 110 provides fuel alert 120 to the user. In this example, adaptive fuel indicator 110 alerts the user when the range is less than any one of the one or more distances from a fuel station of the set $N_{th}$. It should be understood that the alert condition may be satisfied in other ways.

C. Provide the Fuel Alert to the User

When the alert condition is satisfied (e.g., Safe_Level in Equation (2) is less than one), adaptive fuel indicator 110 provides fuel alert 120 to the user. In some embodiments, adaptive fuel indicator 110 provides fuel alert 120 to the user by selecting a route to a fuel station of the set $N_{fs}$ and asking the user if she would like to be re-routed to the selected fuel station. Alternatively, adaptive fuel indicator 110 may automatically re-route the user to the selected fuel station without asking the user if she would like to be re-routed.

1. Routes to One or More POIs

Adaptive fuel indicator 110 may select a fuel station from $N_{fs}$ for re-routing the user. In an example, adaptive fuel indicator 110 compares one or more routes from transportation device 101 to one or more fuel stations of the set $N_{fs}$ and selects the most cost-efficient route. A starting point of a route may be transportation device 101, and a destination point of a route may be a fuel station of the set $N_{fs}$.

Figure 4:
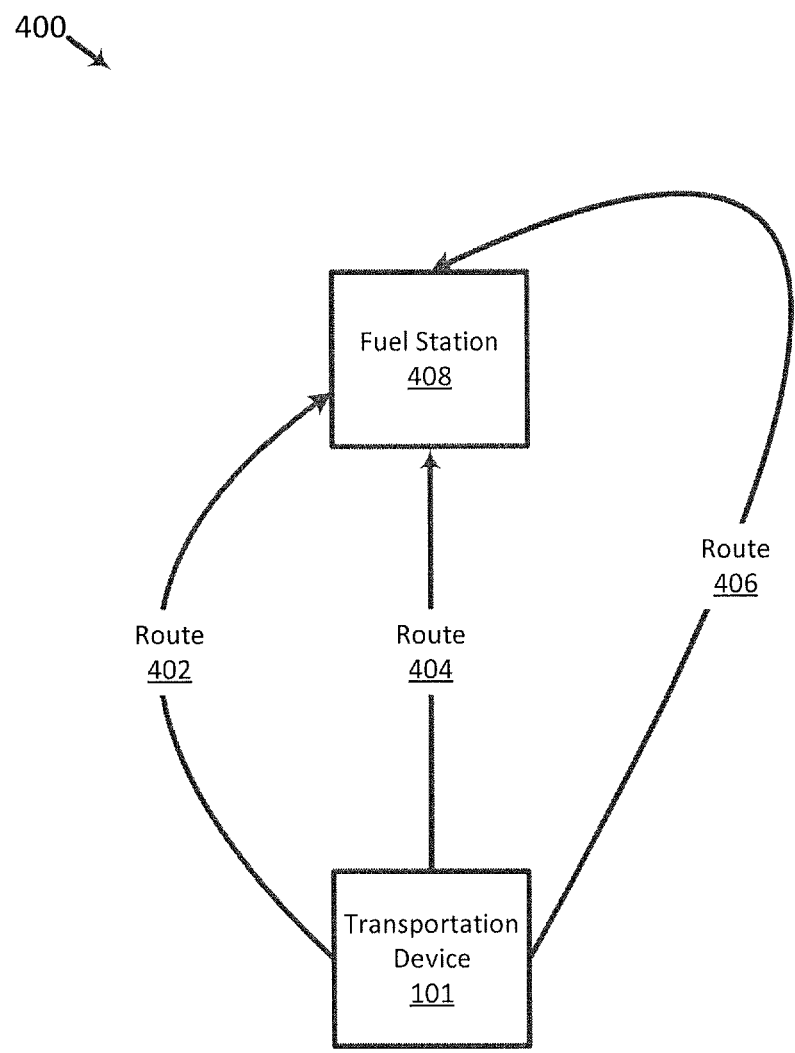
FIG. 4 provides a block diagram illustrating a plurality of routes having the same destination point, according to some embodiments.

In an example, the destination point of each route is the same fuel station. FIG. 4 provides a block diagram 400 illustrating a plurality of routes having a common destination point, according to some embodiments. In FIG. 4, the starting point of routes 402, 404, and 406 is transportation device 101, and the destination point of routes 402, 404, and 406 is fuel station 408. Fuel station 408 may be of the set $N_{fs}$ and may have been selected as being the destination point of each of the routes. In an example, fuel station 408 may be the closest fuel station to transportation device 101 and thus selected due to its proximity to transportation device 101. In another example, fuel station 408 may be the least expensive fuel station of the set $N_{fs}$ and thus selected due to its gas prices. Fuel station 408 may also be selected based on other factors. Adaptive fuel indicator 110 may compare routes 402, 404, and 406 to each other and select one of the routes for re-routing the user.

Figure 5:
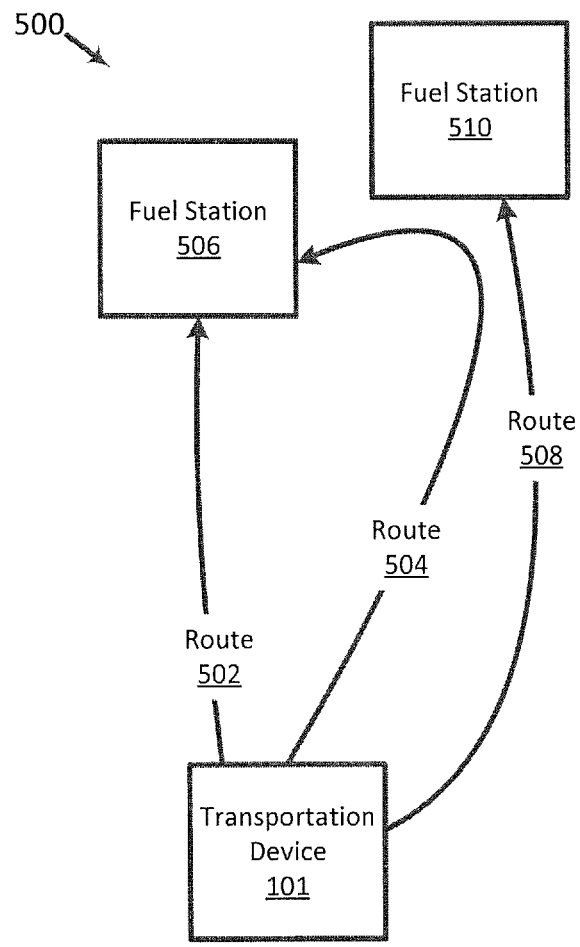
FIG. 5 provides a block diagram illustrating a plurality of routes having different destination points, according to some embodiments.

In another example, the destination points of the routes are different from each other. FIG. 5 provides a block diagram 500 illustrating a plurality of routes having different destination points, according to some embodiments. In FIG. 5, the starting point of routes 502 and 504 is transportation device 101, and the destination point of routes 502 and 504 is fuel station 506. Additionally, the starting point of route 508 is transportation device 101, and the destination point of route 508 is fuel station 510. The destination point of routes 502 and 504 is different from the destination point of route 508. Each of fuel stations 506 and 510 may be of the set $N_{fs}$. Adaptive fuel indicator 110 may compare routes 502, 504, and 508 to each other and select one of the routes for re-routing the user.

Although three routes are illustrated in FIGS. 4 and 5, it should be understood that adaptive fuel indicator 110 may compare a plurality of routes to each other (two, three, four, or more routes) and select one of the routes from the plurality for re-routing the user.

2. Route Information Associated with One or More POIs

The present disclosure may provide improvements in selecting a route for re-routing the user. For example, rather than merely search for the closest fuel station or select a route having the least traffic, techniques are provided to select a route that provides transportation device 101 with the best mileage or that has the least associated cost. For example, route 502 may be shorter than route 504 but may be more congested. A congested route does not provide transportation device 101 with the best fuel efficiency. It may be desirable to select a route using factors other than distance.

Figure 6:
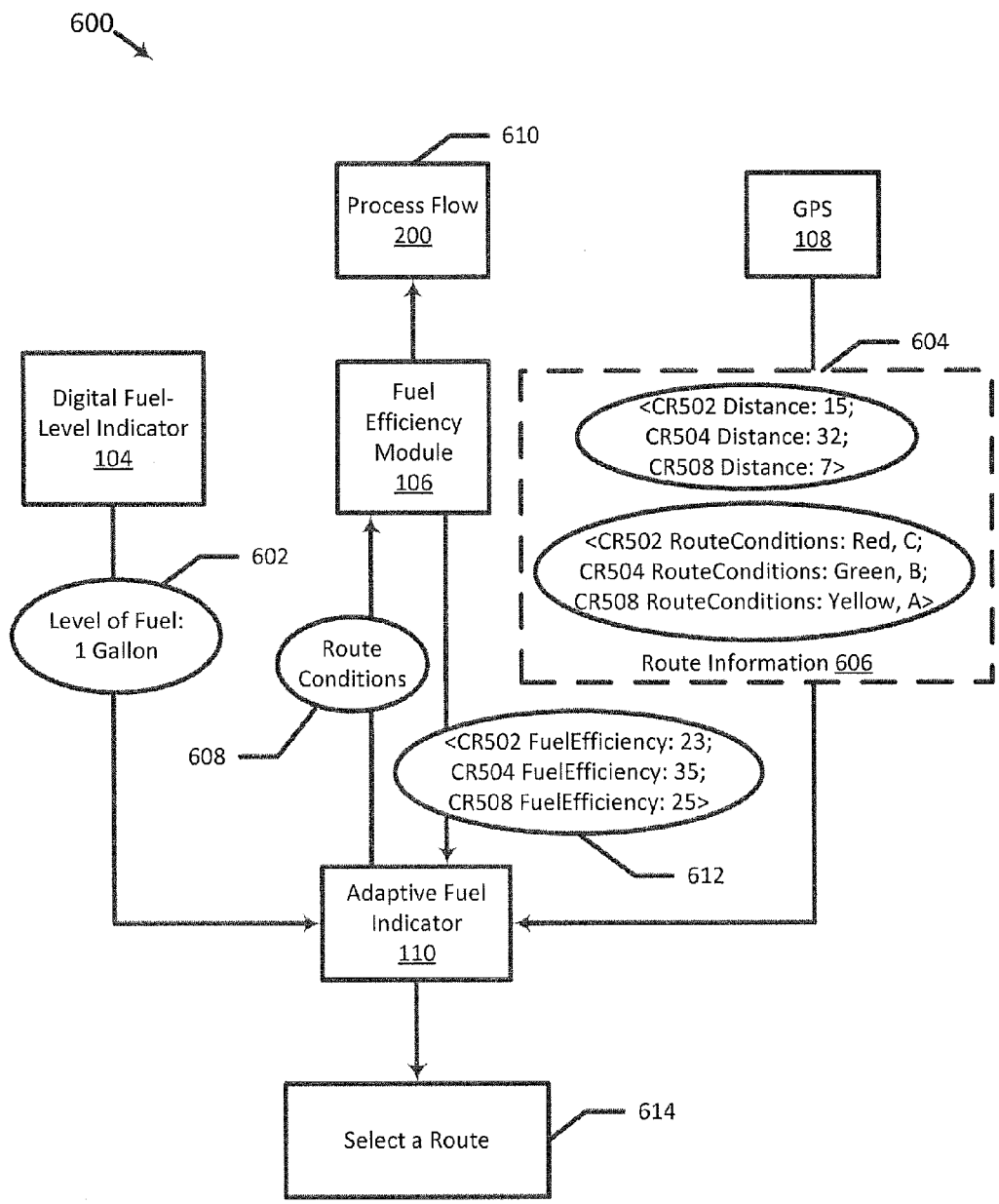
FIG. 6 provides an example process flow of selecting a route from a plurality of routes for re-routing the user, according to some embodiments.

FIG. 6 provides an example process flow 600 of selecting a route from a plurality of routes for re-routing the user, according to some embodiments. Process flow 600 includes an action 602, in which digital fuel-level indicator 104 provides the level of fuel to adaptive fuel indicator 110. In the example illustrated in FIG. 6, transportation device 101 has one gallon of fuel.

Process flow 600 also includes an action 604, in which GPS 108 provides route information 606 about one or more routes to adaptive fuel indicator 110. Route information 606 includes route information about routes 502, 504, and 508. As illustrated in FIG. 5, the starting point of routes 502 and 504 is transportation device 101, and the destination point of routes 502 and 504 is fuel station 506. Additionally, the starting point of route 508 is transportation device 101, and the destination point of route 508 is fuel station 510. Each of routes 502, 504, and 508 may be a route from transportation device 101 to a fuel station of the set $N_{fs}$.

Route information 606 may include the distance and conditions (e.g., traffic condition and/or road condition) of the route. Route information 606 may also include the directions from transportation device 101 to the respective destination point of the route. In the example illustrated in FIG. 6, route information 606 includes route 502's distance (15 miles) and route conditions (heavy traffic conditions and "C" grade road conditions), route 504's distance (32 miles) and route conditions (no traffic and "B" grade road conditions), and route 508's distance (7 miles) and route conditions (light traffic and "A" grade road conditions).

Adaptive fuel indicator 110 may obtain route information 606 and at an action 608, provide the route conditions of the routes to fuel efficiency module 106. Fuel efficiency module 106 obtains the route conditions, and process flow 600 proceeds from action 608 to an action 610, in which fuel efficiency module 106 performs the actions of process flow 200 to obtain the average fuel efficiency. In an example, for each route, fuel efficiency module 106 determines the average fuel efficiency based on the traffic condition and/or road condition of the route by consulting histogram 300. In an example, fuel efficiency module 106 consults histogram 300 and determines that the average fuel efficiency on route 502 would be 23 MPG (see entry 314), the average fuel efficiency on route 504 would be 25 MPG (see entry 310), and the average fuel efficiency on route 508 would be 25 MPG (see entry 312).

At an action 612, for each of the routes, fuel efficiency module 106 provides the average fuel efficiency associated with the route to adaptive fuel indicator 110. Fuel efficiency module 106 may provide N average fuel efficiencies associated with the routes to adaptive fuel indicator 110. Accordingly, adaptive fuel indicator 110 may receive the level of fuel, the distance and route conditions of each of the routes, and the average fuel efficiency associated with each of the routes. At an action 614, adaptive fuel indicator 110 selects a route from the plurality of routes for re-routing the user to the destination point of the selected route (e.g., a fuel station).

3. Select a Route from a Plurality of Routes

In some embodiments, adaptive fuel indicator 110 determines which fuel stations of the plurality of fuel stations ($N_{fs}$) are within transportation device 101's range, compares the average fuel efficiencies associated with the fuel station routes within transportation device 101's range, and selects the route providing transportation device 101 with the highest fuel efficiency. In an example, adaptive fuel indicator 110 determines that fuel stations 506 and 510 associated with routes 502 and 508, respectively, are within transportation device 101's range, and may also determine that fuel station 506 associated with route 504 is not within the range. Route 504 may, for example, have windy roads or may not be a direct route to fuel station 506 (compared to route 502).

Adaptive fuel indicator 110 may identify routes 502 and 508 associated with fuel stations 506 and 510, respectively, within transportation device 101's range and compare these routes to each other. Adaptive fuel indicator 110 may select the route associated with a higher fuel efficiency than another route of the set. For example, adaptive fuel indicator 110 may compare 23 MPG (average fuel efficiency on route 502) and 25 MPG (average fuel efficiency on route 508) and select route 508 because it provides transportation device 101 with better mileage than route 502. In an example, adaptive fuel indicator 110 selects the route associated with the highest fuel efficiency of the set. Adaptive fuel indicator 110 may then provide fuel alert 120 to the user by attempting to route the user to fuel station 510, which is the destination point of selected route 508, via a navigation application (e.g., GPS 108).

4. Apply Weights to Each Route

It may be desirable to take into consideration other factors when selecting a route for the user. In some embodiments, adaptive fuel indicator 110 applies one or more weights to the routes and selects a weighted route from the plurality of weighted routes. In an example, adaptive fuel indicator 110 applies one or more weights to the average fuel efficiencies associated with the routes and selects the route associated with a higher weighted fuel efficiency than another route of the set (e.g., the highest weighted fuel efficiency of the set).

A route may have costs or advantages associated with it. To ensure the selection of a convenient route, adaptive fuel indicator 110 may calculate the costs associated with the routes and select the most cost-efficient route for the user to traverse. For example, it may be possible for a route to have no fuel stations or 10-15 fuel stations in the radius of five miles. It may be desirable for a route to have many fuel stations from which the user may select. In an example, a weight W1 may be applied to a route based on the number of fuel stations along that route. For example, a first route having one fuel station may be associated with a lower weighted average than a second route having three fuel stations. The additional two fuel stations may increase the weighted average associated with that second route. In some embodiments, adaptive fuel indicator 110 applies weight W1 to a route by determining a number of POIs (e.g., fuel stations) within a proximity to the route and multiplying the number by a constant. Adaptive fuel indicator 110 may calculate a product by multiplying the number by the constant, and the product may be added to the average fuel efficiency associated with the route. The sum of the product and average fuel efficiency may be the transportation device's weighted fuel efficiency associated with the route.

In another example, transportation device 101 may already be following an initial route provided by GPS 108. It may be desirable for the fuel station to be as close to the initial route as possible or along the initial route. As discussed, GPS 108 may provide directions from transportation device 101 to the initial route and may also provide directions from transportation device 101 to the fuel station, which is a destination point. To reduce the inconvenience to the user, she may desire the displacement from the initial route to be as small as possible.

In this example, a weight W2 may be applied to a route based on a displacement from the initial route. The displacement is the distance between transportation device 101's current location and the nearest point on the initial route relative to the different routes. In an example, adaptive fuel indicator 110 may calculate the shortest distance to continue on the initial route relative to the others routes, and the histogram and traffic conditions on the displacement route may be used to find the resulting MPG to continue on the initial route. The higher the displacement of the route, the lower the weighted average associated with the route and the lower the chance the route has in being selected by adaptive fuel indicator 110.

The displacement may be converted into units of fuel efficiency (e.g., MPG) to reach the destination point of the initial route. For example, if the user drives to the fuel station and pumps gas, the user may want to proceed back to the initial route and the displacement may be converted into a fuel efficiency based on the user backtracking to the initial route. Adaptive fuel indicator 110 may calculate the displacement fuel efficiency by determining a displacement route and calculating transportation device 101's displacement fuel efficiency based on the displacement route. The displacement route starts at a first location at which the user is no longer on the initial route to a second location at which the user has arrived at the fuel station to a third location at which the user is back on the initial route. In an example, adaptive fuel indicator 110 calculates a displacement fuel efficiency based on the displacement route that would be traveled by transportation device 101 to reach the fuel station and subtracts the displacement fuel efficiency, which is in terms of transportation device's fuel efficiency, from transportation device's average fuel efficiency associated with the route.

In some embodiments, adaptive fuel indicator 110 applies weights W1 and W2 as discussed above and calculates a weighted route in accordance with Equation (3) below:

$$\text{Weight}_{CR}=(\text{FuelEfficiency}_{CR}-\text{MPG}_D)+N*\text{Constant} \quad \text{Equation} \quad (3),$$

where $\text{Weight}_{CR}$=Weighted Route, $\text{FuelEfficiency}_{CR}$=Transportation device's fuel efficiency on the route, $\text{MPG}_D$=Displacement in terms of transportation device's fuel efficiency, and N=Number of Fuel Stations. The constant may be used to increase the probability of finding more fuel stations relative to other costs (e.g., displacement penalty). For example, the user may wish to select a fuel station that is 16 miles away from her initial route but has 10 fuel stations in the area rather than a fuel station that is 2 miles away from her initial route but has only 1 fuel station. Setting the constant to a higher value may provide the user with more comfort. For example, the user may have had bad experiences with fuel stations that did not work in the past and would rather increase her chances of finding an operating fuel station at the cost of backtracking or driving a farther distance. Similarly, the constant may be set to a lower value if it is desirable to keep the costs of the displacement lower.

If Equation (3) were to be represented in a graph diagram, the graph diagram may plot transportation device 101's maximum fuel efficiency on a route, the least deviation from the initial route, and the maximum number of fuel stations on a single route. If adaptive fuel indicator 110 applies weights W1 and W2 as discussed above, the selected route will provide transportation device 101 with the best mileage, the least deviation from the initial route, and the maximum number of fuel stations compared to the other routes.

Adaptive fuel indicator 110 may select the route associated with the highest weighted score (e.g., highest weighted fuel efficiency) and ask the user if she would like to be re-routed to the associated fuel station. Alternatively, adaptive fuel indicator 110 may re-route the user automatically. In an example, once a route has been selected for re-routing the user, the selected route may be displayed on transportation device 101's dashboard and GPS 108 may start re-routing the user to the fuel station associated with the selected route.

It should be understood that adaptive fuel indicator 110 may apply one of weight W1 and weight W2 to a route or both weights to the route. It should also be understood that these are example weights that may be applied, and other weights may be applied to the routes.

IV. Example Method

Figure 7:
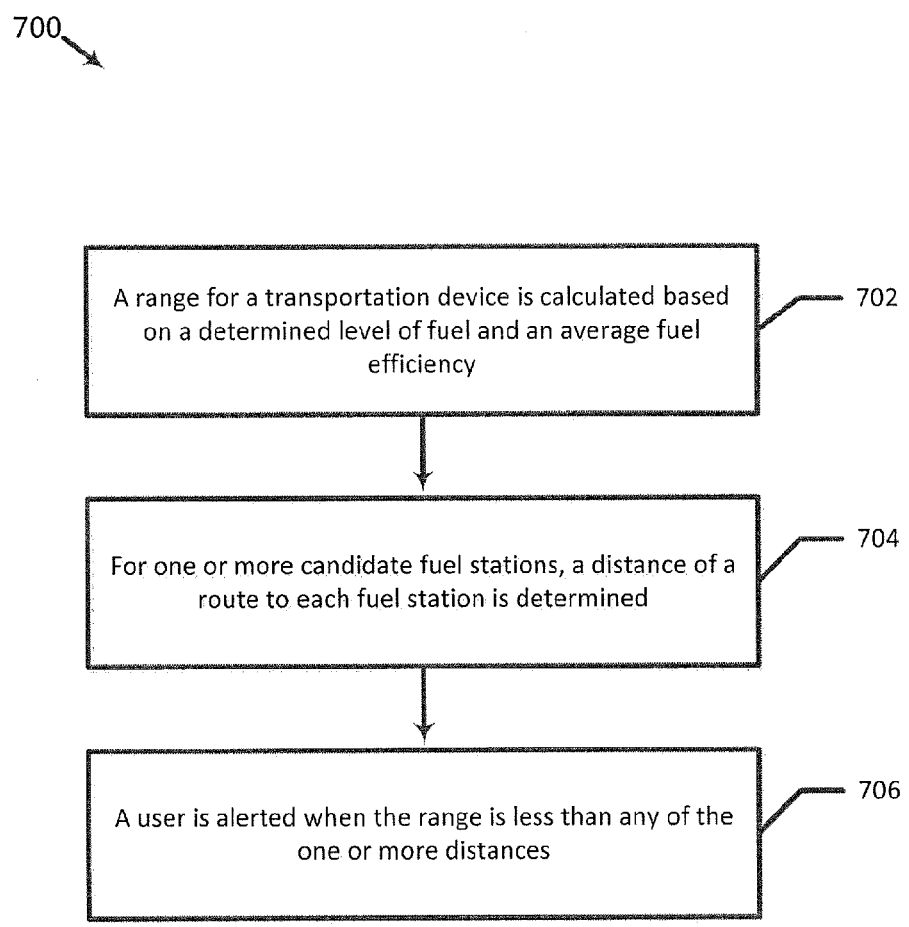
FIG. 7 is a simplified flowchart illustrating a method of providing a fuel alert to a user, according to some embodiments.

FIG. 7 is a simplified flowchart illustrating a method 700 of providing a fuel alert to a user, according to some embodiments. Method 700 is not meant to be limiting and may be used in other applications.

Method 700 includes blocks 702-706. In a block 702, a range for a transportation device is calculated based on a determined level of fuel and an average fuel efficiency. In an example, adaptive fuel indicator 110 calculates a range for transportation device 101 based on a determined level of fuel and an average fuel efficiency. In some examples, fuel efficiency module 106 determines an instantaneous fuel efficiency based on a current traffic condition and a current road condition affecting the transportation device. Fuel efficiency module 106 may store the current traffic condition, the current road condition, and the instantaneous fuel efficiency in histogram 300. Fuel efficiency module 106 may receive the current traffic condition and/or road condition of the route and determine from histogram 300 the average fuel efficiency based on the current traffic condition and/or road condition. If no useful information has been stored in histogram 300, fuel efficiency module 106 may apply a weight to an estimated fuel efficiency, where the weight is based on the current traffic condition. Fuel efficiency module 106 may then determine the average fuel efficiency by applying the weight.

In a block 704, for one or more candidate fuel stations, a distance of a route to each fuel station is determined. In an example, for one or more candidate fuel stations, adaptive fuel indicator 110 determines a distance of a route to each fuel station. In some examples, for each of one or more routes having a distance less than the range, fuel efficiency module 106 may determine the average fuel efficiency associated with the route. Additionally, adaptive fuel indicator 110 may select a route associated with a higher fuel efficiency than another route.

In an example, for each of the one or more routes, adaptive fuel indicator 110 applies one or more weights to the average fuel efficiency associated with the route. In this example, adaptive fuel indicator 110 may select the route associated with a higher weighted fuel efficiency than another route. Adaptive fuel indicator 110 may apply a weight W1 by determining a displacement route based on the route, calculating a displacement fuel efficiency based on the displacement route, subtracting the displacement fuel efficiency from the average fuel efficiency associated with the route, and determining a weighted fuel efficiency based on the subtracting. Additionally, adaptive fuel indicator 110 may apply a weight W2 by determining a number of fuel stations within a proximity to the route, calculating a product based on multiplying the number by a constant, adding the product to the weighted fuel efficiency, and updating the weighted fuel efficiency based on the adding.

In a block 706, a user is alerted when the range is less than any of the one or more distances. In an example, adaptive fuel indicator 110 alerts a user when the range is less than any of the one or more distances. Alerting the user may include providing guidance to the user along the selected route via a navigation application.

It is understood that additional processes may be performed before, during, or after blocks 702-706 discussed above. It is also understood that one or more of the blocks of method 700 described herein may be omitted, combined, or performed in a different sequence as desired.

As discussed above and further emphasized here, FIGS. 1-7 are merely examples, which should not unduly limit the scope of the claims. For example, it should be understood that one or more modules or components in FIG. 1 (e.g., fuel efficiency module 106 and adaptive fuel indicator 110) may be combined with another module or component. It should also be understood that one or more modules or components in FIG. 1 may be separated into more than one module or component.

V. Example Computing Device

Figure 8:
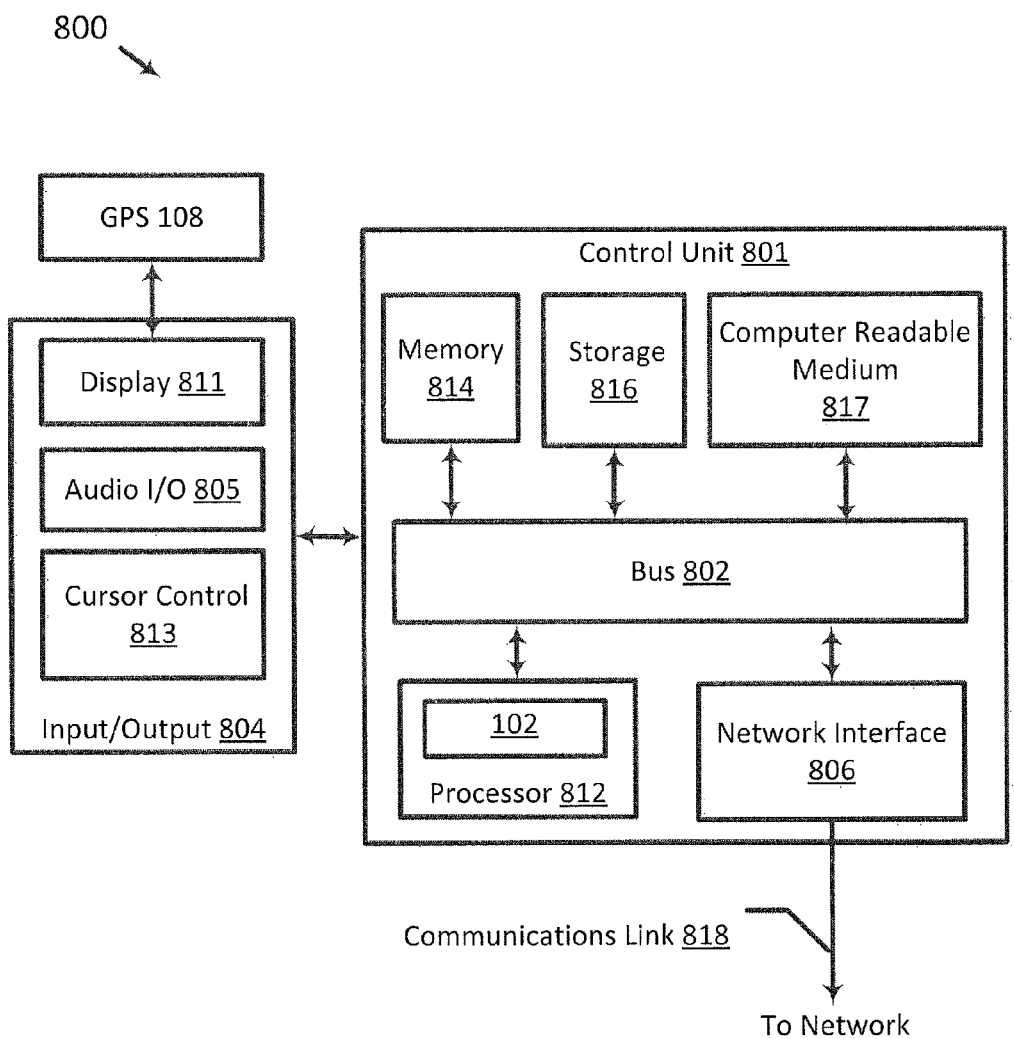
FIG. 8 is a block diagram of a computer system suitable for implementing one or more embodiments of the present disclosure.

FIG. 8 is a block diagram of an example computer system 800 suitable for implementing any of the embodiments disclosed herein. In various implementations, computer system 800 may be a computing device on which smart fuel alert system 102 runs. The computer system 800 may include one or more processors. The computer system 800 may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 800 includes a bus 802 or other communication mechanism for communicating information data, signals, and information between various components of computer system 800. Components include an input/output (I/O) component 804 for processing user actions, such as selecting keys from a keypad/keyboard or selecting one or more buttons or links, etc., and sends a corresponding signal to bus 802. I/O component 804 may also include an output component such as a display 811, and an input control such as a cursor control 813 (such as a keyboard, keypad, mouse, etc.). In an example, the user may use I/O component 804 to enter her preferred POIs (e.g., fuel stations). Additionally, display 811 may be coupled to GPS 108 to display routes to the user.

An audio I/O component 805 may also be included to allow a user to use voice for inputting information by converting audio signals into information signals. Audio I/O component 805 may allow the user to hear audio. A transceiver or network interface 806 may transmit and receive signals between computer system 800 and other devices via a communication link 818 to a network. In an embodiment, the transmission is wireless, although other transmission mediums and methods may also be suitable. In an example, smart fuel alert system 102 communicates with other devices via communication link 818 to obtain and send information. In this example, smart fuel alert system 102 may obtain transportation device's estimated fuel efficiency over the network.

A processor 812, which may be a micro-controller, digital signal processor (DSP), or other processing component, processes these various signals, such as for display on display 811 of computer system 800 or transmission to other devices via communication link 818. Smart fuel alert system 102 may execute in processor 812.

Components of computer system 800 also include a system memory component 814 (e.g., RAM), a static storage component 816 (e.g., ROM), and/or a computer readable medium 817. Computer system 800 performs specific operations by processor 812 and other components by executing one or more sequences of instructions (e.g., process flow 200 or process flow 600 or method 700) contained in system memory component 814. Logic may be encoded in computer readable medium 817, which may refer to any medium that participates in providing instructions to processor 812 for execution. Such a medium may take many forms, including but not limited to, non-volatile media, volatile media, and transmission media. In various implementations, non-volatile media include optical, or magnetic disks, or solid-state drives, volatile media include dynamic memory, such as system memory component 814, and transmission media include coaxial cables, copper wire, and fiber optics, including wires that include bus 802. In an embodiment, the logic is encoded in non-transitory computer readable medium. Computer readable medium 817 may be any apparatus that can contain, store, communicate, propagate, or transport instructions that are used by or in connection with processor 812. Computer readable medium 817 may be an electronic, magnetic, optical, electromagnetic, infrared, or semiconductor device or a propagation medium, or any other memory chip or cartridge, or any other medium from which a computer is adapted to read. In an example, transmission media may take the form of acoustic or light waves, such as those generated during radio wave, optical, and infrared data communications.

In various embodiments of the present disclosure, execution of instruction sequences (e.g., method 700) to practice the present disclosure may be performed by computer system 800. In various other embodiments of the present disclosure, a plurality of computer systems 800 coupled by communication link 818 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise, Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A method of providing a fuel alert to a user, comprising:
collecting one or more instantaneous fuel efficiencies of a transportation device while encountering one or more conditions along one or more routes;
storing one or more average fuel efficiencies in a memory, wherein each average fuel efficiency is associated with at least one condition along the one or more routes;
for one or more candidate fuel stations:
determining a distance of a route to the respective fuel station;
receiving a current condition of the route;
determining whether the memory stores an average fuel efficiency associated with the current condition of the route;
retrieving the average fuel efficiency from the memory if the memory stores the average fuel efficiency associated with the current condition of the route;
calculating a range for the transportation device based on a determined level of fuel and the average fuel efficiency associated with the current condition of the route;
determining a number of fuel stations within a proximity to the route; and
applying a weight to the average fuel efficiency, the weight based on the number of fuel stations, wherein applying the weight includes calculating a product based on multiplying the number of fuel stations by a constant, adding the product to the weighted fuel efficiency, and updating the weighted fuel efficiency based on the adding;
alerting a user when the range is less than any of the one or more distances; and
selecting a first route to a first fuel station associated with a higher weighted fuel efficiency than a second route to a second fuel station.

2. The method of claim 1,
wherein storing the one or more average fuel efficiencies in the memory includes storing the one or more average fuel efficiencies in a histogram.

3. The method of claim 1, wherein a condition of the one or more conditions along the one or more routes is a traffic condition, and wherein receiving the current condition of the route includes receiving a current traffic condition of the route.

4. The method of claim 1, wherein a condition of the one or more conditions along the one or more routes is a road condition, and wherein receiving the current condition of the route includes receiving a current road condition of the route.

5. The method of claim 1, wherein the current condition of the route is a current traffic condition of the route, the method further including:
applying a second weight to an estimated fuel efficiency if the memory does not store the average fuel efficiency, the second weight based on the current traffic condition; and
determining the average fuel efficiency by applying the second weight to the estimated fuel efficiency.

6. The method of claim 1, wherein a first condition of the one or more conditions along the one or more routes is a traffic condition and a second condition of the one or more conditions along the one or more routes is a road condition, and wherein receiving the current condition of the route includes receiving a current traffic condition of the route, the method further including:
for one or more candidate fuel stations:
receiving a current road condition of the route,
wherein determining whether the memory stores the average fuel efficiency further includes determining whether the memory stores the average fuel efficiency associated with the current road condition of the route, and
wherein retrieving the average fuel efficiency from the memory further includes retrieving the average fuel efficiency from the memory if the memory stores the average fuel efficiency associated with the current road condition of the route.

7. The method of claim 1,
wherein the alerting includes guidance to the user along the selected route via a navigation application.

8. The method of claim 1, further including:
for each of one or more routes, applying a second weight to the average fuel efficiency associated with the respective route.

9. The method of claim 8, wherein applying the second weight includes determining a displacement route based on the route, calculating a displacement fuel efficiency based on the displacement route, subtracting the displacement fuel efficiency from the average fuel efficiency associated with the route, and determining the weighted fuel efficiency based on the subtracting.

10. The method of claim 1, wherein the first route has a higher number of fuel stations than the second route.

11. The method of claim 1, further comprising:
calculating the one or more average fuel efficiencies based on the one or more conditions and one or more instantaneous fuel efficiencies.

12. A system for providing a fuel alert to a user, comprising:
a fuel efficiency module that collects one or more instantaneous fuel efficiencies of a transportation device while encountering one or more conditions along one or more routes, and stores one or more average fuel efficiencies in a memory, the one or more average fuel efficiencies based on the one or more conditions and one or more instantaneous fuel efficiencies,
wherein for one or more candidate fuel stations, the fuel efficiency module determines a distance of a route to the respective fuel station, receives a current condition of the route, determines whether the memory stores an average fuel efficiency associated with the current condition of the route, retrieves the average fuel efficiency from the memory if the memory stores the average fuel efficiency associated with the current condition of the route, calculates a range for the transportation device based on a determined level of fuel and the average fuel efficiency associated with the route, determines a number of fuel stations within a proximity to the route, and applies a weight to the average fuel efficiency, wherein the weight is based on the number of fuel stations, wherein the fuel efficiency module applies the weight by calculating a product based on multiplying the number of fuel stations by a constant, adding the product to the weighted fuel efficiency, and updating the weighted fuel efficiency based on the adding; and
an adaptive fuel indicator that alerts a user when the range is less than any of the one or more distances and selects a first route to a first fuel station associated with a higher weighted fuel efficiency than a second route to a second fuel station.

13. The system of claim 12,
wherein the fuel efficiency module stores the one or more average fuel efficiencies in a histogram.

14. The system of claim 12, wherein a condition of the one or more conditions along the one or more routes is a traffic condition, and wherein the fuel efficiency module receives a current traffic condition of the route.

15. The system of claim 12, wherein a condition of the one or more conditions along the one or more routes is a road condition, and wherein the fuel efficiency module receives a current road condition of the route.

16. The system of claim 12, wherein the adaptive fuel indicator guides the user along the selected route via a navigation application.

17. The system of claim 16, wherein for each of one or more routes, the adaptive fuel indicator applies a second weight to the average fuel efficiency associated with the respective route.

18. The method of claim 17, wherein the adaptive fuel indicator determines a displacement route based on the route, calculates a displacement fuel efficiency based on the displacement route, subtracts the displacement fuel efficiency from the average fuel efficiency associated with the route, and determines the weighted fuel efficiency based on the subtracting.

19. The system of claim 12, wherein the fuel efficiency module calculates the one or more average fuel efficiencies based on the one or more conditions and one or more instantaneous fuel efficiencies.

20. A non-transitory computer-readable medium having stored thereon computer-executable instructions for performing operations, comprising:
collecting one or more instantaneous fuel efficiencies of a transportation device while encountering one or more conditions along one or more routes;
storing one or more average fuel efficiencies in a memory, the one or more average fuel efficiencies based on the one or more conditions and one or more instantaneous fuel efficiencies;
for one or more candidate fuel stations:
determining a distance of a route to the respective fuel station;
receiving a current condition of the route;
determining whether the memory stores an average fuel efficiency associated with the current condition of the route;
retrieving the average fuel efficiency from the memory if the memory stores the average fuel efficiency associated with the current condition of the route;

calculating a range for the transportation device based on a determined level of fuel and the average fuel efficiency associated with the current condition of the route;

determining a number of fuel stations within a proximity to the route; and applying a weight to the average fuel efficiency, the weight based on the number of fuel stations, wherein applying the weight includes calculating a product based on multiplying the number of fuel stations by a constant, adding the product to the weighted fuel efficiency, and updating the weighted fuel efficiency based on the adding;

alerting a user when the range is less than any of the one or more distances; and selecting a first route to a first fuel station associated with a higher weighted fuel efficiency than a second route to a second fuel station.

* * * * *